(12) United States Patent
Nahamoo et al.

(10) Patent No.: US 11,797,583 B2
(45) Date of Patent: Oct. 24, 2023

(54) INTELLIGENT DOCUMENT SYSTEM

(71) Applicant: Pryon Incorporated, Raleigh, NC (US)

(72) Inventors: David Nahamoo, Great Neck, NY (US); Igor Jablokov, Raleigh, NC (US); Clifford A. Pickover, Yorktown Heights, NY (US)

(73) Assignee: Pryon Incorporated, Raleigh, NC (US)

( * ) Notice: Subject to any disclaimer, the term of this patent is extended or adjusted under 35 U.S.C. 154(b) by 0 days.

(21) Appl. No.: 16/793,524

(22) Filed: Feb. 18, 2020

(65) Prior Publication Data

US 2020/0265188 A1 Aug. 20, 2020

Related U.S. Application Data

(60) Provisional application No. 62/807,182, filed on Feb. 18, 2019.

(51) Int. Cl.
| | |
|---|---|
| *G06F 16/332* | (2019.01) |
| *G06F 40/205* | (2020.01) |
| *G06F 16/48* | (2019.01) |
| *G06F 16/93* | (2019.01) |
| *G06F 40/186* | (2020.01) |
| *G06N 5/043* | (2023.01) |

(52) U.S. Cl.
CPC .......... *G06F 16/3329* (2019.01); *G06F 16/48* (2019.01); *G06F 16/93* (2019.01); *G06F 40/205* (2020.01); *G06F 40/186* (2020.01); *G06N 5/043* (2013.01)

(58) Field of Classification Search
CPC .............................. G06F 16/3329; G06F 16/48
See application file for complete search history.

(56) References Cited

U.S. PATENT DOCUMENTS

| | | |
|---|---|---|
| 6,934,715 B2 | 8/2005 | Kalmes et al. |
| 9,613,191 B1* | 4/2017 | Kataoka ............... G06F 21/105 |
| 9,953,019 B2 | 4/2018 | Shimkus |
| (Continued) | | |

OTHER PUBLICATIONS

Zhong Min Juan, An Effective Similarity Measurement for FAQ Question Answering System, 2010 International Conference on Electrical and Control Engineering, IEEE computer society, 2010, pp. 4638-4641 (Year: 2010).*

(Continued)

*Primary Examiner* — Scott T Baderman
*Assistant Examiner* — Seung Woon Jung
(74) *Attorney, Agent, or Firm* — Occhiuti & Rohlicek LLP

(57) ABSTRACT

An intelligent document system provides one or more users, who are recipients of documents, with a way to "interact" with the documents for example for the purpose of understanding the content of the documents, and taking appropriate action in response to receiving the documents. Interacting with one or more documents can include navigating the documents guided by semantic content of the documents, asking questions that are answered based on the content of the documents. In some examples, the documents are "dynamic" in that users can manipulate data in the document for example for multiple different views or analyses. In some examples, the documents are augmented semantics and ontology that will allow the user to accurately navigate the document and achieve the natural interfacing they desire.

16 Claims, 2 Drawing Sheets

(56) References Cited

U.S. PATENT DOCUMENTS

| | | |
|---|---|---|
| 10,419,942 B2 | 9/2019 | Yang et al. |
| 2002/0194038 A1 | 12/2002 | Sauser et al. |
| 2008/0052519 A1 | 2/2008 | Lee et al. |
| 2009/0157452 A1 | 6/2009 | Arora et al. |
| 2012/0078926 A1 | 3/2012 | Chu-Carroll et al. |
| 2012/0216114 A1* | 8/2012 | Privault .............. G06F 3/04883 715/702 |
| 2015/0088888 A1* | 3/2015 | Brennan ................ G06F 16/38 707/737 |
| 2018/0239959 A1* | 8/2018 | Bui ....................... G06F 40/103 |
| 2020/0125600 A1* | 4/2020 | Jo ..................... G06K 9/00369 |

OTHER PUBLICATIONS

International Search Report and Written Opinion dated May 25, 2020 in PCT Application No. PCT/US2020/018624.

\* cited by examiner

INTELLIGENT DOCUMENT SYSTEM

CROSS-REFERENCES TO RELATED APPLICATIONS

This application claims the benefit of U.S. Provisional Application No. 62/807,182 filed on Feb. 18, 2019, which is incorporated herein by reference.

BACKGROUND OF THE INVENTION

This invention relates to an intelligent document system.

Documents are important in today's world for many reasons. Documents are portable and may often be attached in an email, associated with a workflow, uploaded to discussion groups or team rooms, downloaded and printed, etc. Also, documents are generally persistent and may serve as a record of a transaction. They can consolidate many pieces of information and bring them together in a single, readable item.

Currently, users often encounter documents with pages of terms and conditions, which are often skimmed or totally ignored. When a user has questions, it may be difficult to obtain understandable and actionable insights into such documents. Thus, a need exists for a user conversational element to facilitate understanding of documents.

A number of "delivery" mechanisms that currently exist for man-machine interfaces include (1) web-based applications, (2) native applications, which execute on a user's computer, and (3) standard format files (e.g., Portable Document Format, PDF). Historically, a dominant delivery mechanism has been through file transfer with local readers/editors (programs) available for any specific format such as a PDF, Word document, HTML browser, etc. The file delivery has remained a critical delivery mechanism, at least in part because of signature requirements for legal purposes, portability and naturalness of using paper as an interface (along with the ease of readability on paper and the persistence of paper, even when computing systems crash), and legacy technology adoption.

In many use cases, such as for utilities (e.g. an electric bill), file methodology fails to allow for long-duration analysis and as such it fails to provide the richness of native and web apps. The paper signature legacy transition to digital signature is very slow and will take years to become the norm. As such, a different solution to the problem is needed.

A common problem with file-centric processing where unstructured and structured data exist in the file is that a rich natural language interface does not exist for users to navigate the document according to their needs and desires. As such, for example, many documents have long pages of explanation that are in small font that if needed force the user to read the entire explanation, sometimes including terms and conditions, to find the key information they need. Even if a user had time to read these terms and conditions, few users might understand all aspects of the terms they are agreeing to or being constrained by.

SUMMARY OF THE INVENTION

In a general aspect, an intelligent document system provides one or more users, who are recipients of documents, with a way to "interact" with the documents for example for the purpose of understanding the content of the documents, and taking appropriate action in response to receiving the documents. Interacting with one or more documents can include navigating the documents guided by semantic content of the documents, asking questions that are answered based on the content of the documents. In some examples, the documents are "dynamic" in that users can manipulate data in the document for example for multiple different views or analyses. In some examples, the documents are augmented semantics and ontology that will allow the user to accurately navigate the document and achieve the natural interfacing they desire.

In one aspect, in general, a method for document processing includes maintaining a storage or one of more augmented documents (132A-Z), each augmented document having a renderable document content (134A-Z) and having metadata (136A-Z). A document interface (140) is provided to a user. The document interface provides (1) a display for presenting the renderable documents, and (2) a natural language interface for accepting input from the user and in return presenting information from the renderable documents on the display. The document interface implements at least one of a question answerer and an intelligent search function that accepts the input from the user and uses the metadata from the augmented documents to determine information for presenting on the display. In some examples, the document interface further implements a signing function for recording a signature in association with an augmented document, and transmitting the signature to a document source associated with the augmented document. In some examples, the document interface implements a question answerer that processes a natural language question from the user, locates one or more portions of the renderable documents as containing an answer to the question, and presents information in those portions to the user in the display. In some examples, the document interface implements a question answerer that processes a natural language question from the user, and combines information from multiple of the augmented documents to form an answer to the question and presents the answer to the user in the display.

Aspects may include one or more of the following features.

The document interface further implements a signing function for recording a signature in association with an augmented document, and transmitting the signature to a document source associated with the augmented document.

The document interface implements a question answerer that processes a natural language question from the user, locates one or more portions of the renderable documents as containing an answer to the question, and presents information in those portions to the user in the display.

The document interface implements a question answerer that processes a natural language question from the user, and combines information from multiple of the augmented documents to form an answer to the question and presents the answer to the user in the display.

At least some of the augmented documents are accepted from corresponding document sources.

At least some of the renderable documents are accepted from corresponding document sources, and at least some of the accepted renderable documents are processed to form the corresponding metadata. For example, the processing of the documents includes at least one named entity recognition and question generation based on the documents.

The metadata for at least some augmented documents includes a data structure encoding information represented in the renderable document. For example, the data structure comprises an association of at least one natural language sequence associate with the information represented in the document.

The document interface provides a way for the user to access external information sources, and identifies information sources relevant to the displayed documents.

In another aspect, in general, an intelligent document system includes an intelligent document comprising a required user interaction based on document text within the intelligent document. The system includes an artificial intelligence (AI) interpreter comprising a natural language processing service, configured to process natural language queries and identify document related responses utilizing an interaction layer within the intelligent document. An AI-assisted user interface is configured to navigate the intelligent document and provide document-related responses from an interaction layer in response to receiving the natural language queries.

In another aspect, in general, a method of operating an intelligent document system includes operating an artificial intelligence (AI) interpreter comprising a natural language processing service configured to process natural language queries and identify document-related responses utilizing an interaction layer within the intelligent document. A user interaction is received through an AI-assisted user interface associated with the intelligent document. A document-related response through the AI user interface may be based in part on previous operations of the AI interpreter with the interaction layer.

In another aspect, in general, an AI means is used for reading, interpreting, and conversing with a document. This AI means automatically supplies an interpretive interface to a user, based on a trigger.

Aspects can include one or more of the following features.

The document may require an action, such as a signature (or "I agree").

The trigger can be one of: opening a document, accessing a web page, opening a document that is similar to one signed in the past, etc.

The action can be one of: a handwritten signature, the checking of a checkbox in a document GUI, a passing of a CAPTCHA test (e.g. to prove the user is human), etc.

The interpretive interface facilitates user understanding, user tracking, advice to a user, or tracking by a trans-vendor service that has access to one or more documents from different companies.

The AI is invoked when a user has a query regarding a document or must take an action with the document.

The AI service helps users navigate a document (e.g. by highlighting, moving a cursor or icon, scrolling a page, speaking out loud when a user is reading certain sections or sentences, providing diagrams, creating popup comment bubbles, etc.).

The navigation of the document takes place through natural language queries that are either spoken of typed to the interface of the application and the result and/or response from document is provided by existing visual rendering of the document.

The response can additionally be spoken and/or displayed in a separate generic dialog box of the application.

The result and/or response can be calculated from the content of the document (e.g. no predefined visual exists for the change of a portfolio in 2 months and the document has access to functions that calculate the change and provide the answer through the generic visual and/or spoken dialog box).

The natural language query operates on an unstructured part of the document, e.g. Terms and Conditions, and provide the response textually and/or spoken in the generic dialog box The application provides connectivity to the internet/cloud and the natural language query is applied to vast amounts of knowledge available in the private cloud of the enterprise and/or to public/published knowledge available in the public cloud.

The AI technologies and the associated AI models about the document reside in the cloud and the natural language queries are sent to the cloud for understanding and conversational interaction.

The AI-associated AI models are either contained in the document or a special URL exists in the document that enables loading of the associated models to the AI technologies site for processing.

The AI technologies and the associated AI models reside locally in the compute device of the end user.

The user can require technical support and customer care problem solving services that are not available in the document and its associated cloud knowledge and the user is automatically connected to a customer support agent and/or an automated AI service to resolve customers problems/issues, e.g. a perceived mistake in the statement.

The human agent or the automated agent has access to the document for simplifying the communication between the two parties as the user describes the issue, e.g. by verbally pointing to the problem on page 3, table 2, row 6, column 4.

A trans-vendor service (e.g. with access to one or more documents from more than one company) provides tips, help, warnings, a means for facilitating user comprehension, etc. For example, the trans-vendor service may have access to terms and conditions of a user's recent bill, an email service, a social media service, a subscription web page, an app web page, etc.

The signature for a document (e.g. a contractual agreement) triggers a trans-vendor service to track and share associated terms and conditions from other document providers, and makes suggestions about other services (e.g. from other vendors) that provide similar or complementary services or features.

A cognitive aspect is noted when a user signs, or is about to sign, a document (e.g. level of user distraction).

The AI service warns the user the next time he or she is about to sign a related document or agree to related document terms.

The AI service monitors changes to terms and conditions relative to past terms and conditions (e.g. insurance terms, credit card terms, book contract terms)

The AI service receives information on a "level" (or "type") of signature for a document for example in which a user is stating a version of himself such as hobbyist, company representative, etc.

The signing of a document provides linkages so that other entities, such as various companies and/or their AI representatives, may access the current document for example to provide, in the future, similar or complementary services, contracts, terms and conditions, etc.

The AI service tracks the scope of the document (e.g. does it refer to some restricted scope, like an electric bill, or a wider scope, such as an agreement restricting a user from performing some action or providing a service for a period of five years.)

The AI service has information of conditions from other contract offers or colleagues of the user, who may be willing to share a subset of their agreement information with one or more people in their social network, etc.

DETAILED DESCRIPTION

Figure 1:
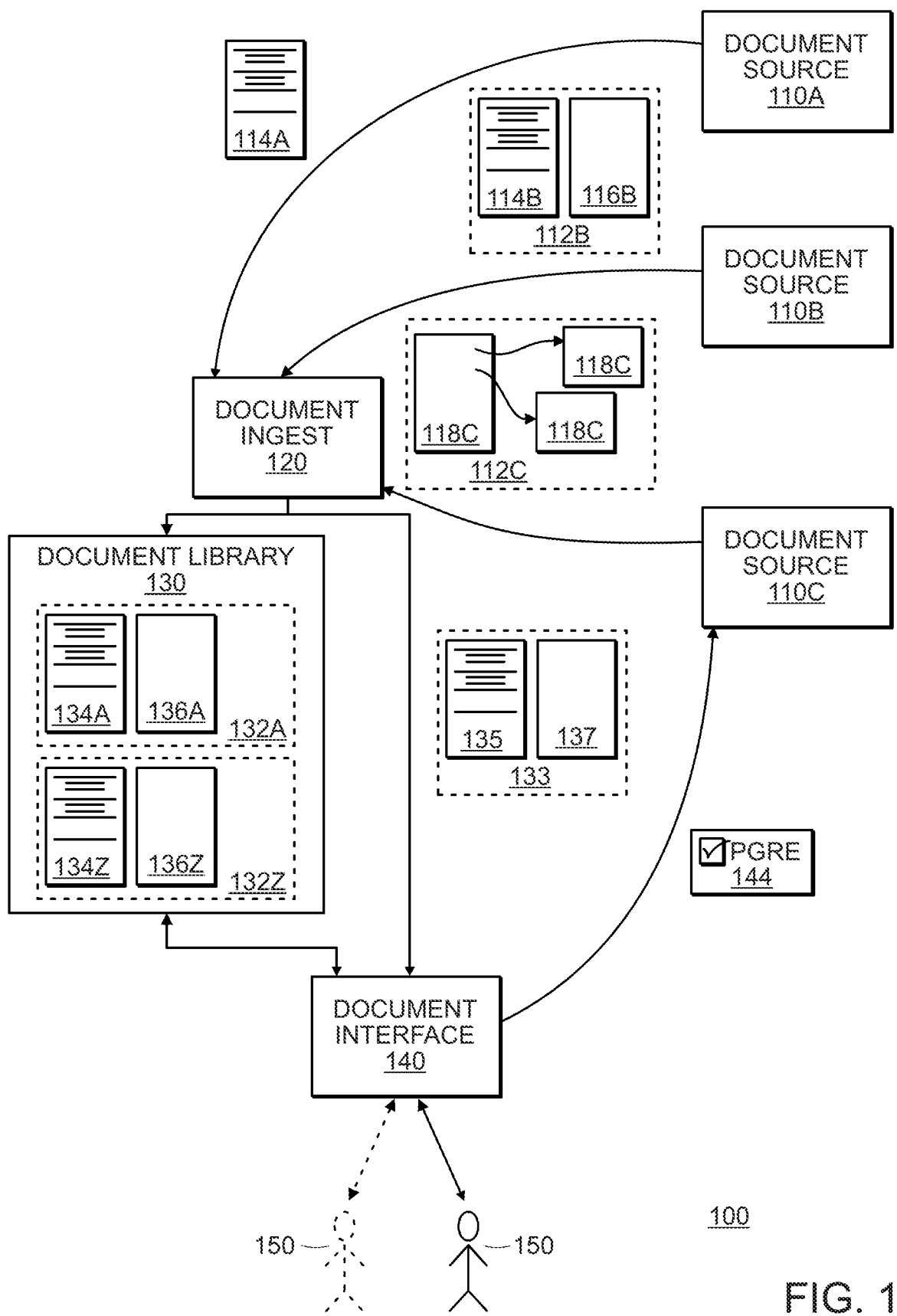
FIG. 1 is diagram of an intelligent document system.

Referring to FIG. 1, an intelligent document system 100, which may be referred to as an artificial intelligence (AI) service, provides a way for a user 150, or set of users 150 in one or more roles, to interact with documents provided by a number of document sources 110A-C. A user "interacting" with a documents can include a variety of acts. As one example, the document may elicit an agreement by the user, for example, requiring an affirmative statement (e.g., "I Agree") signifying that the user agrees with terms specified in the document. As another example, the user may explore the document, for example, by searching for content in the document or asking questions that may be answered based on the content of the document. As another example, the interacting may be initiated by the system, for example, pointing out a particular part of a received document or making an assertion that is based on the content of the document, for example, in the form of a warning or alert to the user. These are merely examples of ways in which a user might interact with documents.

Preferably, the user interacts with documents using a natural language interface, for example, by entering natural language text, or speaking similar utterances. Alternatively, or in addition to such means for natural language input, other modes of input, such as via a graphical user interface (GUI), via a stylus (e.g., for signing), and the like can be used. As far as output, the system preferably provides written or synthetically spoken natural language output, generally also including graphical output for example to present parts of the documents, or synthesized summary information derived from the document, for example, in the form of a table or a graph.

Referring to FIG. 1, a document interface 140 implements the artificial intelligence and natural language processing capabilities required to support the type of user interactions outlined above. For example, the document interface 140 may include an automatic speech recognizer (ASR), a natural language processing (NLP) system, and a question answering (QA) system.

The system 100 may include a document library 130 that holds a history of documents with which the user 150 has interacted. The document interface 140 permits the user to interact with documents stored in the library, and the document interface may combine information in multiple documents to support its interaction with the user. As one example, documents in the library may include a history of different versions of a document from one document source, and the document interface can determine changes from one version to another as part of answering a question from the user or proactively point out a change that the user may not have noticed.

Turning now to the document sources 110A-C, different document sources may provide different types of documents, and not all types of documents are supported in every example of the system 100 that is deployed. A first exemplary document source 110A produces documents 114A that represent printed or printable documents in text form, for example, stored electronically according a Portable Document Format (pdf) standard. Such a document 114A may merely include scanned or otherwise printable images of document pages, or may have a minimal amount of document structure information, for example, with bookmarks that identify sections of the document. Such a document 114A requires at least some preprocessing to make it suitable for interaction with the recipient user 150.

A second exemplary document source 110B may provide a document 112B, which includes printable content 114B, much like the printable document 114A from source 110A, but additionally includes at least some metadata 116B. A wide variety of types of metadata may be present. For example, some metadata may relate the structure of the printable document 114B, for example, corresponding to a table of contents. In the case of a document that needs to be signed, the metadata may relate to the required signatory, or terms being agreed upon. More complex metadata may be incorporated at the source, for example, including a semantic representation of the document content in the form of a knowledge map or other machine-interpretable form, which may have been manually authored at the document source, or wholly or partially automatically generated from the document content. For example, if the document is a commercial invoice, the metadata may include an XML or a JSON-based representation of the invoice amount, item description, date due, and the like.

A third exemplary document source 110C provides a structured document 112C, for example, in the form of linked hypertext with separate document parts 118C being linked together to form the overall document 112C. One common example of such a structured document comprises a set of linked web pages accessible via a link (e.g., address or uniform resource locator URL) to a root document part 118C. Such a web-based document may have structural elements, such as headings etc., indicated in a markup language (e.g., HTML, hyper-text markup language), but typically does at least today include semantic structure.

In general, whatever the document source, a document (e.g., 114A, 112B, 112C) is received by a document ingest processor 120 which processes the document to determine metadata for the document based on what it has received. For example, the original document (e.g., 114A) is copied into the system to form part of an augmented document 133, which includes a copy of the received document 135, as well as derived or provided metadata 137. Although not essential to be precomputed, the metadata 137 helps the document interface 140 perform tasks such as intelligent search and question answering on the document. The processing by the document ingest processor 120 can include, for example, natural language preprocessing that determines at least some linguistically based information, such as detection and recording of locations of named entities (e.g., person and company names) in the document, expansion of structured data such as tables into searchable form such as equivalent text, preprocessing of lexical items (e.g., word) in the text of the document with techniques such as BERT (Bidirectional Encoder Representations from Transformers), parsing to form parse trees or other syntactic or semantic structure, and information extraction into knowledge representations, such as a predefined frame structure. In some examples, the augmentation of a document can include automatic question generation so that these generated questions are allocated with particular locations in a document or with a particular information field, and when processing questions from a user, a similarity between the user's question and such automatically generated questions are used to answer the user's question by returning the information associated with that automatically generated question. In some examples, the augmented document 133 is provided after ingestion to the document interface 140.

In embodiments in which the user has a document library 130, the augmented document 133 is also saved in the document library, which includes previously received documents 132A-Z, which respectively include the corresponding received documents 134A-Z and derived metadata 136A-Z.

Figure 2:
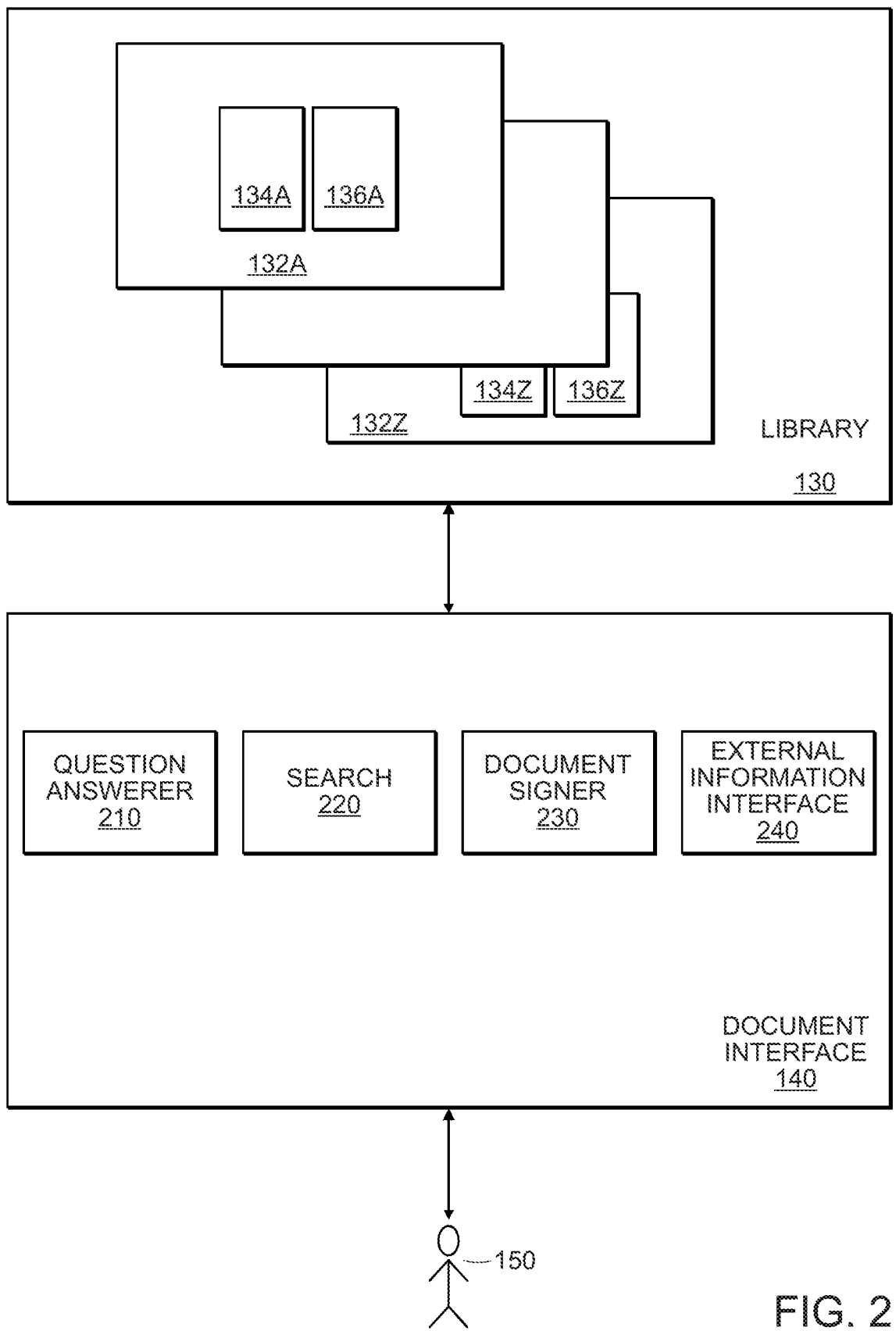
FIG. 2 is a diagram illustrating components of a document interface.

Referring to FIG. 2, turning again to the document interface 140, one of the functions implemented in the interface is a question answerer 210. One implementation of question answering is trained on text that is representative of the documents in the library for the purpose of mapping a text-based question (e.g., typed of spoken to the system) to a location in a document that contains the answer. In operation, the text-based question and portions of the documents or their preprocessed forms are provided as input to the question answerer and the outputs of the question answerer are indications of whether the answer to the question is located at positions in the portions of the documents.

In some implementations, the question answerer 210 includes artificial intelligence capabilities that go beyond question answering by locating positions of an answer within the documents. One such capability that may be built is related to aggregation of information across similar documents. For example, if the library includes a monthly series of invoices, the artificial intelligence capability can support questions that require reduction of data over multiple documents, for example, to respond to a request for a summation of a quantity (e.g., billings), trends, averages, and the like.

Another function implemented in the interface is a search component 220. This component is configured to input a text-based search query and to identify potentially relevant passages of the documents in the library, and these passages are presented to the user, for example, as highlighted portions displayed in their context in the documents.

Yet another component relates of a document signer 230. As introduced above, at least some documents are provided to the user for the user to review and indicate his agreement by a signature or some other indicator of agreement. As illustrated in FIG. 1, upon the user indicating to the document interface 140 that an agreement is to be sent back to the document source, the appropriate agreement data 144 (e.g., a web-based form response) is passed back to the document source.

Note that the library 130 includes a record of agreements that the user may have made in the metadata for the corresponding documents. Therefore, the document interface can respond to questions or other interactions that relate to the state of agreements made by the user in the past. This capability lets the user interact with the document library, for example, with a question of whether the user has previously agreed to do or not do a particular thing. For example, as a user selects "I Agree" check boxes on web-based forms, the library records what the user actually agreed to, and provides a way for the user to review or query the user's existing agreements. Furthermore, the document signer 230 may implement a conflict check that determines possible conflicts between an agreement that the user proposes to make and a previously made agreement.

Another component of the document interface 240 includes an external (or "global") information interface 240. This interface is used to access information sources that may be needed to resolve user questions, and provides somewhat of a "concierge" function to the user. For example, domain specific definitions, legal requirements, etc. may be accessible for the purpose of answering user questions or for the interface to proactively inform or warn the user that the external information should be reviewed, for example, before executing an agreement. In some examples, the external information interface is configured before being made available in the document interface, for example, including a machine learning component that is trained on documents for similar or a wide range of domains. In some examples, the training is used to identify particularly significant parts of documents that a user should pay attention to, and may be trained to identify the sources of external information that can help the user interpret the sections. For example, the sources of external information may include reference articles, identifiers of human consultants (e.g., lawyers with expertise in the domain), or external artificial intelligence systems that may be accessed by the user.

As introduced above, a number of the functions of the document interface are proactive and do not require the user to solicit specific output. For example, when accessing a document such as a document that has just been ingested from a document source, the presentation may have a variety or proactive presentations. For example, a navigation map, which may be in the form of a synthesized table of contents, tabs in a multiple-tabbed display, may identify distinct sections of the document and potentially indicate which sections are proactively identified as being important, for example, based on machine learning of a global set of documents. When presenting a particular section, a sidebar to the particular document may identify other documents and sections of documents that are related to what is being displayed. Similarly, particularly important sections may be highlighted based on machine learning training and the reason for the highlighting (e.g., because of importance in a particular context) may be indicated in a sidebar. For example, particularly important parts of a terms or service agreement, for example, may be highlighted to the user. In this way, the user may be able to review the important parts of a document, and parts that are related to parts of other documents quickly. Importance highlighting may also be based on the user having previously identified important sections of prior documents in the library, and the highlighting may be based on similarity to those previously identified sections. Importance highlighting may also be based on differences between a current document and prior documents in the library. For example, if a document source sends periodic terms to the user, then a change from a previous version to the next can be highlighted to the user so that they do not miss what has changed. In some versions of the system, there are potentially large number of ways that a document can be proactively annotated (i.e., highlighted, sidebar comments, etc.) and the user may choose a subset of those ways to actually use in any particular situation.

Referring back to FIG. 1, the document ingest function 120 is illustrated as being associated with the user. However, some document sources may include some of the functions of the ingest function, and essentially send a pre-analyzed document. For example, document source 110B may be an example of such a source and the data 116B may already be of the form useful to the document interface, thereby reducing the work that the document ingest 120 must perform, and potentially providing more information than can easily be extracted from a document without annotation, such as a document 114A from document source 110A.

As an example of pre-analyzing of a document prior to being sent to a user, an example of a use case is a financial institution periodically sending a financial statement to a customer. One form of pre-analysis may be providing of an explicit document structure, for example providing the hierarchical structure of sections and subsections, tables, graphs, etc. Such structure might be provided in the form of a JSON file, which either includes the content directly in its structure, or includes pointers to a printable representation of the document. Another form of pre-analysis may be to include the content of the document in a machine-interpretable form, for example, with named fields in the JSON file, for example, with "account balance" or "interest earned" fields. In some versions, instead of merely including identifiers such as "account balance", the JSON may have one or more questions that correspond to the value in a field, such as "the total account value at the end of the statement period." In this way, a question answering function of the document interface may more easily find the relevant data in response to a user question. One way to implement this form of question answering is to automatically compare a user's input text with the questions provided in the document, and if they are similar then the information in the document is provided to the user. As an example, if the user asks "what is my account balance" then this word sequence may be found similar to "the total account value at the end of the statement period" and the value pointed to by that question is provided in response to the user.

Note that a financial institution may send thousands of financial statements out each period, all with the same general structure. Therefore, an authoring component that helps structure the documents to include both the conventional printed rendering or online hyperlinked form as well as a JSON or other form can form a generic document, which is then composed for each user with their specific information. Similarly, there may be context information that is known to be useful to the document interface that is included in the data for the document. For example, in the case of a financial statement, an enumeration of the stocks owned by a user may be added as a field in the data representation, even if that list is not localized in a particular place in the rendered document. In this way, the user can refer to "my stocks" and have the document interface be able to resolve the reference. Also, accuracy may be improved by constraining analysis (e.g., speech recognition) to only permit stock names that are listed as being relevant to that user. The authorizing component may be deployed in various ways, for example, as a software application that is executed at a document source's site, or as a shared service that is performed on a server that is accessible to one or more document sources. In some examples, rather than including all the generic data for a document type authored by a document source in the documents themselves, this generic data may be stored in a shared location (e.g., on a server) and a reference to the data included in the document. Then, the document interface accesses that generic information from the shared location and combines it with the document-specific information that comes with the document itself.

Yet other arrangements of where document analysis is performed can be used. For example, document sources may send their documents via a service that performs at least some of the analysis prior to sending the documents to the users. In such a situation, the service has an advantage of being able to analyze the documents as a set, and may be able to identify common parts as compared to user-specific parts, thereby aiding in the highlighting of what a user should pay attention to in reviewing a document.

In some implementations, the document libraries for multiple users, and possibly the document interface for those users are maintained as a shared service. For example, each user may have privacy control over that user's library so that other users are prevented from accessing those documents. Some of such implementations of function as described above with the difference largely being one of where computational aspects are hosted. In some implementations, there is a controllable amount of sharing between users. For example, a user may permit sharing of highlighting of sections of documents that user has found important, and then if that same or similar document is encountered by another user, a corresponding section is highlighted for that other user. Therefore the specific content is not shared, thereby maintaining privacy, but the importance of document sections is shared. In this way, a "crowd sourcing" approach may be used for the analysis of documents. In some implementations, an organization may maintain a library for multiple of its users, thereby benefiting from sharing of information among the users. In some such implementations, different users have different needs to be authorized to take different actions (e.g., signing on behalf of the organization) and the system provides appropriate capabilities for such different users.

Another aspect of the document interface is that different users may have different characteristics, such as levels of sophistication in a particular domain, and the document interface uses this context in determining what to proactively present to the user and in answering questions or searching for content for the user based on user queries. Such user characteristics or user context may be used as a supplementary input to machine learning components, or may be used to filter outputs based on their relevance to users with certain characteristics.

Although the description above may emphasize traditional file-centric processing, the approaches described are equally applicable to processing for content from websites, mobile apps, desktop apps, and the like, and in particular processing of content that may require some agreement such as a Terms & Conditions agreement, End-User License Agreement (EULA), or a Privacy Policy agreement. These legal agreements define terms, policies, and acceptable uses. They may also be accompanied by "I agree" checkboxes. A user may maintain a shared library among the devices controlled by the user and can make queries whose responses depend on documents received at different devices.

A number of artificial intelligence, natural language processing, and speech recognition technologies may be incorporated to provide the overall functions described above. It should be recognized that at least some implementations of these component technologies are well understood and thereby are not described in detail in this document. For example, speech recognition may be implemented using neural network techniques as described in Yu, Dong, and Li Deng. *Automatic Speech Recognition*, Springer London Limited, 2016. Natural language processing, including question answering, question/text similarity, and question generation processing can use neural network techniques for example, as described in Devlin, Jacob, Ming-Wei Chang, Kenton Lee, and Kristina Toutanova. "BERT: Pre-training of deep bidirectional transformers for language understanding." *arXiv preprint* arXiv: 1810.04805 (2018), and Chan, Ying-Hong, and Yao-Chung Fan. "BERT for Question Generation." In *Proceedings of the* 12*th International Conference on Natural Language Generation*, pp. 173-177. 2019, as representative publications.

Embodiments described above may be implemented in software, including using computer instructions stored on machine-readable media (e.g., disks) that when executed or interpreted by a data processor cause the system to perform the functions described above. In some embodiments, some of the functions may be implemented in hardware, for example, using Field Programmable Gate Arrays (FPGAs) or Application Specific Integrated Circuits (ASICs). For example, some of the neural network processing may be performed by such special-purpose hardware. It should be understood that the data processing may be distributed to multiple computers, for example, with one computer performing the function on ingesting documents, while another computer may implement the user interface and question answering function.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for document processing, the method comprising:
    maintaining a storage for one of more augmented documents each augmented document having a renderable document content and having metadata; and
    providing a document interface to a user, the document interface providing (1) a display for presenting the renderable documents, (2) a natural language interface for accepting input from the user and in return presenting information from the renderable documents on the display, and (3) an agreement function for soliciting and recording an agreement by the user based on content of a document from the one or more augmented documents, wherein the document interface implements a question answerer that processes a natural language question from the user, locates one or more portions of the renderable documents as containing an answer to the question, and presents information in those portions to the user in the display;
    wherein the document interface performs one or more artificial intelligence (AI) semantic functions on the document, including to generate augmented semantic data for the content of the document based on the one or more AI semantic functions, wherein the user interacts with and navigates through the document based on the generated augmented semantic data, the augmented semantic data being generated prior to use of the document according to the one or more AI semantic functions that include:
    a question answer function to automatically generate questions allocated to particular locations of the agreement, wherein content at one of the particular locations of the document is returned during use of the augmented document by the user when a subsequently submitted question from the user matches, based on a similarity criterion, one or more of the automatically generated questions allocated to one of the particular locations of the agreement;
    wherein the document comprises a contract with terms and conditions, and wherein the one or more AI semantic functions include at least one of:
        determining conflict between one or more of the terms and conditions and one or more of past terms and conditions of agreements previously made by the user; or
        determining changes between at least one of the terms and conditions and at least one of the past terms and conditions of the agreements previously made by the user.

2. The method of claim 1, wherein the document interface further implements a signing function for recording a signature in association with an augmented document, and transmitting the signature to a document source associated with the augmented document.

3. The method of claim 1, wherein the question answerer processes a natural language question from the user, and combines information from multiple of the augmented documents to form an answer to the question and presents the answer to the user in the display.

4. The method of claim 1, further comprising:
    accepting at least some of the augmented documents from corresponding document sources.

5. The method of claim 1, further comprising:
    accepting at least some of the renderable documents from corresponding document sources; and
    processing the at least some of the renderable documents to form a corresponding metadata.

6. The method of claim 1, wherein the document interface provides an interface for the user to access to external information sources, and identifies relevant information sources to the document.

7. The method of claim 1, wherein the metadata for at least some augmented documents includes a data structure encoding information represented in the renderable document.

8. The method of claim 7, wherein the data structure comprises an association of at least one natural language sequence associated with the information represented in the document.

9. The method of claim 1, wherein the document interface provides an interface for the user to access to external information sources, and identifies relevant information sources to displayed document.

10. The method of claim 1, wherein the natural language interface is for searching for information in multiple of the augmented documents in response to a question input from the user.

11. The method of claim 1, further comprising receiving the metadata for a renderable document, said metadata including a structured representation of sematic information in the renderable document for use by the document interface in response to a natural language question input by the user.

12. The method of claim 1, further comprising generating metadata for a renderable document for use in responding to a user's natural language input via the document interface, the generating of the metadata including one or more of (a) recording of locations of named entities in said document, (b) expansion of structured data in said document into searchable form such as equivalent text, (c) preprocessing of lexical items in said document, and (d) parsing said document to form syntactic or semantic structure.

13. The method of claim 1, wherein the one or more AI semantic functions further include:
    a generic content function to generate generic-identifier augmented data identifying generic parts of the agreement and user-specific parts of the agreement requiring closer review by the user.

14. A computer implemented intelligent document system comprising:
- one or more processor-based devices, and one or more storage devices coupled to the one or more processor-based devices, implementing:
  - an intelligent document comprising a required user interaction based on document text within the intelligent document;
  - an artificial intelligence (AI) interpreter comprising a natural language processing service, configured to process natural language queries and identify document related responses related to the required user interaction utilizing an interaction layer within the intelligent document; and
  - an AI assisted user interface configured to navigate the intelligent document and provide document related responses from the interaction layer in response to receiving the natural language queries, the AI assisted user interface implementing a question answerer to process a natural language question from the user, locate one or more portions of the document text as containing an answer to the question, and present information in those portions to the user on a display, the AI assisted user interface further configured to perform one or more artificial intelligence (AI) semantic functions on the intelligent document, including to generate augmented semantic data for content of the document based on the one or more AI semantic functions, wherein a user interacts with and navigates through the document based on the generated augmented semantic, the augmented semantic data being generated prior to use of the document according to the one or more AI semantic functions;
- wherein the intelligent document comprises a contract with terms and conditions,
  - wherein the one or more AI semantic functions further includes:
  - automatically generating questions allocated to particular locations of the contract, wherein content at one of the particular locations of the contract is returned when a subsequently submitted question from a user matches, based on a similarity criterion, one or more of the automatically generated questions associated with one of the particular locations of the contract;
- and wherein the one or more AI semantic functions include at least one of:
  - determining conflict between one or more of the terms and conditions and one or more of past terms and conditions of agreements previously made by the user; or
  - determining changes between at least one of the terms and conditions and at least one of the past terms and conditions of the agreements previously made by the user.

15. A method of operating an intelligent document system, the method comprising:
- operating an artificial intelligence (AI) interpreter comprising a natural language processing service configured to process natural language queries and identify document related responses related to respective required user interactions of a document utilizing an interaction layer within the intelligent document;
- receiving a user interaction through an AI assisted user interface associated with the intelligent document, the AI assisted user interface implementing a question answerer to process a natural language question from the user, locate one or more portions of document content as containing an answer to the question, and present information in those portions to the user on a display;
- communicating the document related response through the AI user interface based in part on previous operations of the AI interpreter with the interaction layer; and
- performing one or more artificial intelligence (AI) semantic functions on the intelligent document, including to generate augmented semantic data for the document content of the intelligent document based on the one or more AI semantic functions, wherein the user interacts with and navigates through the document based on the generated augmented semantic data, the augmented semantic data being generated prior to use of the document according to the one or more AI semantic functions;
- wherein the intelligent document comprises a contract with terms and conditions,
  - wherein the one or more AI semantic functions further includes:
  - automatically generating questions allocated to particular locations of the contract, wherein content at one of the particular locations of the contract is returned when a subsequently submitted question from a user matches, based on a similarity criterion, one or more of the automatically generated questions associated with one of the particular locations of the contract;
- and wherein the one or more AI semantic functions include at least one of:
  - determining conflict between one or more of the terms and conditions and one or more of past terms and conditions of agreements previously made by the user: or
  - determining changes between at least one of the terms and conditions and at least one of the past terms and conditions of the agreements previously made by the user.

16. The method of claim 15, wherein the one or more AI semantic functions include:
- automatically generating questions allocated to particular locations of the document, wherein content at one of the particular locations of the document is returned when a subsequently submitted question from the user matches, based on a similarity criterion, one or more of the automatically generated questions associated with the one of the particular locations of the document.

\* \* \* \* \*